United States Patent [19]

Hsu et al.

[11] Patent Number: 5,409,875

[45] Date of Patent: Apr. 25, 1995

[54] POLYMER-SUPPORTED CATALYST FOR POLYMERIZATION AND COPOLYMERIZATION OF OLEFINS

[75] Inventors: Cheng C. Hsu; Lixin Sun, both of Kingston, Canada

[73] Assignee: Queen's University, Kingston, Canada

[21] Appl. No.: 28,072

[22] Filed: Mar. 8, 1993

[51] Int. Cl.⁶ .................. C08F 4/611; C08F 4/614; C08F 10/00

[52] U.S. Cl. .................... 502/109; 502/115; 502/125; 502/151; 502/105; 502/152; 502/153; 502/119; 526/142; 526/127; 526/141; 526/144; 526/348.5; 526/352; 526/904; 526/906

[58] Field of Search ............... 502/105, 109, 115, 125, 502/151, 152, 153, 119

[56] References Cited

U.S. PATENT DOCUMENTS

| | | | |
|---|---|---|---|
| 3,259,609 | 7/1966 | Satake et al. | 528/502 |
| 3,396,155 | 8/1968 | Delbouille et al. | 526/142 |
| 4,147,664 | 4/1979 | Pomogailo et al. | 526/142 |
| 4,182,811 | 1/1980 | Bocharov et al. | 526/142 |
| 4,431,568 | 2/1984 | Miya et al. | 526/127 |
| 4,900,706 | 2/1990 | Sasaki et al. | 526/119 |

*Primary Examiner*—Edward J. Smith
*Attorney, Agent, or Firm*—Richard J. Hicks

[57] ABSTRACT

A polymer supported catalyst comprises Ziegler-Natta catalysts immobilized on a magnesium-modified polymer support. The catalyst support is prepared by (1) dissolving a carboxyl group-containing polymer in a solvent and precipitating the polymer in a polar non-solvent, (2) wet-grinding the precipitated polymer, and (3) mixing the ground polymer with an organomagnesium compound or a complex of an organomagnesium compound and an organoaluminum compound to give a magnesium-modified polymer support. Optionally, the resulting magnesium-modified support is treated with a halogen-containing silicon compound. The catalysts may be loaded onto the support by reacting the magnesium-modified support with a transition metal compound to form a catalyst constituent, and then combining the catalyst constituent with an appropriate organometallic compound. The supported catalyst is highly active and suitable for the polymerization and copolymerization of olefins without substantial contamination of the resulting products with chlorine or metal ions, as is the case with conventional $MgCl_2$-supported catalysts.

19 Claims, No Drawings

POLYMER-SUPPORTED CATALYST FOR POLYMERIZATION AND COPOLYMERIZATION OF OLEFINS

BACKGROUND OF THE INVENTION

I. Field of the Invention

This invention relates in general to supported catalysts useful for the polymerization of olefins, especially alpha-olefins. More particularly, the invention relates to polymer supported catalysts of this kind, to methods of producing such catalysts and to the polymer supports themselves.

II. Description of the Prior Art

Polyolefins, especially polyethylene and its copolymers, are important commodity plastics with annual world production of over a billion pounds. Most polyolefins are produced by the well known Ziegler-Natta polymerization reaction which involves the use of a catalyst composed of a compound of a transition metal belonging to Group IV to VI of the Mendeleev Periodic Table (e.g. titanium, zirconium, vanadium or chromium) and an organometallic compound of a metal belonging to Group I to III of the Mendeleev Periodic Table (e.g. lithium, magnesium or aluminum).

While unsupported Ziegler-Natta catalysts may be used for polymerizations of this type, supported catalysts are now generally preferred for polyolefin production because they exhibit much higher activities than non-supported catalysts and therefore provide the advantage that the traditional de-ashing step to reduce titanium residue levels in the polymer products can be eliminated. Most of the materials used as supports for the catalysts are inorganic compounds, the most common being magnesium chloride as disclosed, for example, in U.S. Pat. Nos. 4,329,253 and 4,452,914.

Although the use of these highly active magnesium chloride-supported catalysts has resulted in a substantial reduction of titanium residue levels in polymer products, the contents of magnesium and chloride contributed by the supports themselves are not negligible and can have unfavorable effects on polymer processing and quality. For example, excessive chloride contents can cause corrosion problems in polymer processing equipment and excessive magnesium contents can cause moisture adsorption and water carryover in film fabrication.

It would therefore be advantageous to develop a support which could enhance the activity of Ziegler-Natta catalysts without introducing into the polymer products excessive levels of metal ions, halides or other inorganic impurities.

It has been suggested that the use of polymers as supports for the Ziegler-Natta catalysts could overcome these problems, for example in U.S. Pat. Nos. 4,268,418, 4,289,651, 4,329,255, 4,397,764, 4,477,639, 4,623,707, 4,632,912 and 5,051,484. However, it is fair to say that the development of polymer supported catalysts has not been very successful because the activities of such polymer-supported catalysts are usually not high enough for commercial use when compared to magnesium chloride-supported catalysts and because the supported catalysts are generally not easy to prepare.

Accordingly, there is a need for polymer supports for such catalysts that can result in higher catalytic activities that remain stable over suitable lengths of time.

OBJECTS OF THE INVENTION

An object of the present invention is to provide a polymeric catalyst support capable of being used to produce a supported Ziegler-Natta type catalyst of sufficiently high activity for commercial use.

Another object of the invention is to provide a supported Ziegler-Natta type catalyst of high activity for the polymerization of olefins, particularly polyethylene and ethylene copolymers.

Another object of the invention is to make it possible to carry out polymerization of olefins using polymer-supported catalysts of high activity.

SUMMARY OF THE INVENTION

The present invention, which is based on an extensive study of numerous polymer supports and catalyst constituents, relates to a polymer-supported catalyst for olefin polymerization and copolymerization, to a method of preparing this catalyst as well as to the catalyst supports themselves and reactions carried out using the supported catalysts.

The present invention requires the use of a polymer containing carboxyl functional groups as a support for Ziegler-Natta type catalysts intended for the polymerization and copolymerization of olefins, particularly for the production of polyethylene and ethylene copolymers.

Without wishing to be bound by an as yet unproved scientific theory, it appears that the carboxyl groups of the polymer support react with and bind components of the catalyst without inhibiting, and to the contrary possibly enhancing, the overall catalytic activity. Catalytic activities of at least 24 kg polyethylene/hr/gTi/monomer partial pressure (atm.) of an alpha-olefin may be achieved, which activities are comparable to those achieved by $MgCl_2$-supported catalysts.

The catalysts and the supports are prepared by a particular series of steps carried out on the carboxyl group-containing polymers or copolymers. These steps are described in more detail below, but include precipitation in a polar solvent, e.g. methanol, reaction with an organomagnesium compound or complex, optional treatment with a halogen-containing silicon compound and then reaction with the Ziegler-Natta catalyst components.

Incidentally, by the term "polar" as applied to a solvent, we mean a solvent comprising asymmetric molecules possessing permanent dipoles resulting from an uneven spatial distribution of electronic charges about the positively charged nuclei.

The supported catalysts of the present invention have physical and chemical properties that are largely dependent on the nature of the support materials. The polymer supports of the invention: (1) contain desirable amounts and proper distribution of suitable functional groups on which the transition metal compounds of the Ziegler-Natta catalyst can be loaded; (2) have satisfactory mechanical properties; (3) have no unfavorable effects on active centres and polymerization; and (4) are generally inexpensive, readily available, relatively safe to use and non-toxic.

The novel polymer-supported catalysts of this invention are suitable in particular for ethylene polymerization and copolymerization. At least in its preferred forms, the invention offers the following advantages: (1) it reduces or eliminates the corrosion and other problems caused by chloride and magnesium associated with magnesium chloride-supported catalysts; (2) the catalyst has higher activity than prior art polymer catalysts we have encountered; (3) the support material may be a commercially available polymer material; and (4) the preparation of the supported catalyst is relatively simple, and requires only unsophisticated equipment and the chemicals employed are generally less hazardous than many of those required for other supported catalysts.

It is also found that the catalysts of the present invention tend to remain stable during polymerization reactions for considerable periods of time (at least two hours), and are thus acceptable for industrial process control.

DETAILED DESCRIPTION OF THE INVENTION AND THE PREFERRED EMBODIMENTS

The catalyst support of the present invention is a particular kind of functional group-containing homopolymer or copolymer that has been subjected to various treatments. The functional groups of the polymer are carboxyl groups, i.e —COX, wherein X may be —OH, —OR$^1$ (R$^1$ being an alkyl group of 1 to 20 carbon atoms) or —NR$^2{}_2$, wherein the two R$^2$ groups may be the same or different and each represents —H or an alkyl group of 1 to 20 carbon atoms. Most preferably, the functional groups are carboxylic acid groups (—COOH) present in an amount of about 5–30% by weight of the total weight of the polymer.

The identity of the remainder of the polymer is not particularly important provided that it is relatively inert with respect to the active sites of the resulting catalyst (i.e. provided the desired catalytic activity is not adversely affected by the remaining polymer units). While an aromatic carboxyl group-containing polymer may be employed, if desired, non-aromatic, non-crosslinked, preferably linear polymers are the most preferred.

Known carboxyl group-containing polymers and copolymers may be used in the present invention, or conventional methods of synthesis may be employed for producing novel polymers for the supports. Acrylate and methacrylate polymers and copolymers are especially preferred in the present invention, particularly copolymers with ethylene, propylene and styrene. A particularly preferred product is a copolymer of ethylene and acrylic acid having a molar ratio of 92:8, respectively. A suitable product of this type can be obtained from Polysciences Inc., of Warrington, Pa. 18976, U.S.A.

In order to make the carboxyl group-containing polymer suitable as a catalyst support, the polymer is first dissolved in an inert, preferably non-polar solvent, e.g. boiling toluene, and then precipitated in a polar non-solvent, e.g. methanol. Surprisingly, the precipitation in a polar solvent is found to result in the formation of a catalyst of much greater activity than similar catalysts prepared without this step. Even if a non-polar non-solvent is used instead of a polar non-solvent for the precipitation step, again a catalyst of much reduced activity (approximately one third) is formed.

After the precipitation step, the polymer is pulverized by means of a wet-grinding technique in which the polymer is co-milled with an inert liquid, e.g. heptane, in a grinding or milling device, e.g. a porcelain ball mill, at about ambient temperature (the lower the temperature, the better). Wet grinding is employed because dry grinding gives undesirable flaky materials rather than a fine powder suitable as a catalyst dispersant, possibly due to local overheating. The pulverization is preferably carried out until the polymer is reduced to particles having a size in the range of 5 to 100 $\mu$m. The finely dispersed suspension obtained in this way can then be used directly for the next stage of the catalyst synthesis according to the following steps.

(1) The ground polymer support is mixed with an organomagnesium compound (e.g. dibutyl magnesium), or a complex of an organomagnesium compound and an organoaluminum compound (e.g. a complex of di-n-butyl magnesium and triethyl aluminum), at a predetermined temperature for a period of time sufficient for substantially complete reaction between the carboxyl functional groups and the organometallic compounds to give a magnesium-modified polymer support. The reaction temperature and time may be varied within a certain range, but should be chosen to achieve a substantially complete reaction between the functional groups of the polymer and the magnesium compound or complex. A preferred temperature range is 25 to 60° C. and a preferred time range is 30 to 180 minutes. After the reaction is complete, the solid phase may be filtered out and washed with a dry hydrocarbon solvent to remove the unreacted magnesium compound or complex.

(2) The magnesium-modified polymer support may then optionally be treated with a halogen-containing silicon compound, e.g. trichlorosilane (HSiCl$_3$), to produce a solid product. Halogenation of the magnesium compound or complex may take place during this stage, thus forming Mg—Cl linkages which may be effective in the catalyst for the same reasons as the equivalent linkages in the known MgCl$_2$ catalyst supports. Here again, however, there is no desire to limit the invention by reference to this theory.

Catalyst supports prepared both with and without optional step (2) are found to be effective for olefin polymerization, but have slightly different performances. Thus catalyst supports prepared without step (2) are generally found to have better activity for the homopolymerization of ethylene, whereas supports prepared with step (2) generally have better activity for olefin copolymerizations. The latter type of support seems to be more susceptible to a chain transfer reaction by hydrogen to give lower molecular weight polymers.

The modified polymers prepared by step (1) alone or those produced by a combination of step (1) and step (2), after being washed and filtered, may be regarded as catalyst supports which are then loaded with the components of a Ziegler-Natta catalyst, e.g. as indicated below. It should be noted that the supports produced in this way may be commercial products in their own right and may be sold or distributed with the intention of being loaded with the catalyst components at a later time. The supports have a long shelf life if kept in suitable conditions, e.g. up to one year if kept at room temperature in a dry inert atmosphere.

(3) In order to convert the catalyst supports produced as above into active catalysts, the catalyst supports are brought into reaction with a transition metal compound, preferably titanium tetrachloride, suitable for use as a Ziegler-Natta catalyst at an elevated temperature but below the softening point of the polymer support, e.g. within the range of 30 to 70° C. After a suitable period of time (generally 30 to 180 minutes), the reaction mixture is filtered, washed with a dry hydrocarbon liquid to remove the unreacted transition metal compound and dried thoroughly, e.g. in a stream of nitrogen or argon, to give a polymer-supported catalyst constituent.

(4) The aforementioned polymer-supported catalyst constituent can then be activated with an organometallic compound of a metal of Group II or III in Mendeleev Periodic Table (e.g. magnesium or aluminum), preferably a trialkyl aluminum (e.g. triisobutyl aluminum), as a Ziegler-Natta cocatalyst or component to give a highly active polymer-supported catalyst particularly suited for the polymerization of ethylene and the copolymerization of ethylene with higher alpha-olefins.

Polymerizations utilizing the polymer supported catalysts of the invention may be carried out in the conventional manner in which the monomers are reacted in the liquid phase at a pressure in the range of 1–20 arm. and at a temperature in the range of 20° to 90° C. Pressures of about 20 atm., similar to those required for conventional polymerization processes using other supported catalysts, are normally employed. Hydrogen may be employed to control the molecular weight of the resulting polymer, e.g. polyethylene. The branch number and length, density, melting point and crystallinity of the polyethylene can also be regulated via copolymerization with appropriate higher alpha-olefins.

It is to be noted in particular that the supported catalysts of the present invention are capable of producing branch-free polyethylene with an ultrahigh molecular weight, high melting point and high crystallinity, when desired.

Since the catalyst support is a polymer, the resulting polyolefin products contain lower levels of inorganic impurities compared with polyolefins produced by reactions catalyzed by magnesium chloride-supported catalysts. In particular, the content of undesirable chlorine is considerably reduced. This is clear from a comparison of compositions of a catalyst produced according to the present invention and a typical $MgCl_2$-supported catalyst as shown in Table 1 below:

TABLE 1

| | Content (wt. %) | | |
|---|---|---|---|
| | Catalyst of the invention | | Typical $MgCl_2$- |
| Element | # 7-5 | # 7-6 | supported catalyst |
| Ti | 1.49 | 1.35 | 2.26 |
| Mg | 1.01 | 1.66 | 18.4 |
| Cl | 2.4 | 10.0 | 60.3 |
| Balance | polymer | polymer | other components* |

*catalyst modifiers, such as Lewis bases, often added to conventional catalysts.

It will therefore be apparent that the catalysts according to the invention are much less likely to produce chlorine contamination of the product polymer than the conventional catalyst, while the activity levels may be similar.

While the catalyst of the invention is principally intended for the catalysis of polymerization and copolymerization of olefins, particularly, alpha-olefins, they may also possibly catalyze the polymerization and copolymerization of other materials, e.g. styrene.

The following Examples are provided to illustrate the invention further, but should not be construed as limiting the invention to the particular reactants and conditions described therein.

EXAMPLE 1

10 g poly(ethylene-acrylic acid 92:8) was dissolved in 200 mL boiling toluene and precipitated in 800 mL methanol. The precipitated polymer was filtered and dried at 60° C. i.vac overnight. Then the dried polymer was co-milled with 200 mL dry heptane in a porcelain ball mill under nitrogen atmosphere for 120 hours to give a polymer powder suspension. 60 mL of this suspension was mixed with 20 mL di-n-butyl magnesium-triethyl aluminum complex in heptane (0.518 mmol Mg/mL, Mg/Al=8.51) at 60° C. for 1 hour with adequate agitation. The reaction mixture was filtered and the solid was washed with dry heptane. The resulting solid magnesium-modified polymer support was added to 30 mL titanium tetrachloride and heated for one hour at 60° C. for vigorous stirring. The reaction mixture was again filtered and the solid phase was washed with plenty of dry heptane and then dried under nitrogen stream to yield a polymer-supported catalyst constituent containing 1.49% wt Ti; 1.01% wt Mg and 2.4% wt Cl.

The polymerization was carried out in a 500 mL autoclave which was purged with nitrogen and charged with ethylene monomer and 250 mL heptane. 0.4 mmol triisobutyl aluminum was added as cocatalyst. 11.6 mg solid catalyst constituent described above was added to start the polymerization. Ethylene was introduced continuously to maintain the total pressure at 2 atm. After 2 hours reaction at 70° C., methanol was added to quench the polymerization. The polymer yield was 28.9 kg polyethylene/g-Ti.h.$P_{C_2H_4}$(atm). The resulting polyethylene was branch-free with melting point 141.6° C., crystallinity (DSC) 74.3%, bulk density 0.33 g/cm$^3$ and density 0.952 g/cm$^3$.

EXAMPLE 2

The solid catalyst constituent prepared in Example 1 was utilized in polymerization in the presence of hydrogen. The polymerization procedure was basically the same as in Example 1 except that a prescript amount of hydrogen was charged into the reactor to control the molecular weight of the polyethylene product. The results are given in the Table 2 below:

TABLE 2

| Component | Run A | Run B | Run C | Run D |
|---|---|---|---|---|
| monomer(s) | ethylene | ethylene | ethylene | ethylene |
| catalyst | Example 1 | Example 1 | Example 1 | Example 1 |
| milimoles of Ti | 0.0036 | 0.0035 | 0.0034 | 0.0037 |
| milimoles of Al | 0.40 | 0.41 | 0.40 | 0.41 |
| solvent | heptane | heptane | heptane | heptane |
| liters of solvent | 0.25 | 0.25 | 0.25 | 0.25 |
| hydrogen pressure (mm Hg) | 0 | 81 | 160 | 227 |
| monomer pressure (mm Hg) | 1166 | 1120 | 1039 | 950 |
| reaction temperature (°C.) | 70 | 70 | 70 | 70 |
| reaction time (minute) | 120 | 120 | 120 | 120 |
| catalyst yield kg PE/g-Ti.h.atm ($C_2H_4$) | 28.9 | 30.9 | 25.8 | 17.6 |

EXAMPLE 3

The solid catalyst constituent prepared in Example 1 was utilized in the copolymerization of ethylene with 1-hexene. The polymerization procedure was similar to that in Example 1 except that a prescript amount of 1-hexene was injected into reactor as comonomer and that the polymerization was carried out for 15 minutes. The polymer yield was much higher than that of homopolymerization. The results are given in the Table 3 below:

point of 141.8° C., a crystallinity(DSC) of 74.5%, a bulk density of 0.30 g/cm³ and a density of 0.952 g/cm³.

TABLE 3

| Component | Run A | Run B | Run C | Run D | Run E |
|---|---|---|---|---|---|
| monomer | ethylene | ethylene | ethylene | ethylene | ethylene |
| comonomer | 1-hexene | 1-hexene | 1-hexene | 1-hexene | 1-hexene |
| catalyst | Example 1 | Example 1 | Example 1 | Example 1 | Example 1 |
| milimoles of Ti | 0.0049 | 0.0041 | 0.0043 | 0.0045 | 0.0040 |
| milimoles of Al | 0.40 | 0.41 | 0.40 | 0.41 | 0.37 |
| solvent | heptane | heptane | heptane | heptane | heptane |
| liters of solvent | 0.25 | 0.25 | 0.25 | 0.25 | 0.25 |
| monomer concentration (mol/L) | 0.115 | 0.115 | 0.112 | 0.112 | 0.112 |
| comonomer concentration (mol/L) | 0 | 0.029 | 0.064 | 0.16 | 0.32 |
| reaction temperature (°C.) | 60 | 60 | 60 | 60 | 60 |
| reaction time (minute) | 15 | 15 | 15 | 15 | 15 |
| catalyst yield kg polymer/g-Ti.h | 11.8 | 51.7 | 96.6 | 102.1 | 114.6 |
| melting point (°C.) | 141.7 | 136.0 | 130.9 | 126.7 | 124.0 |
| crystallinity (%) | 72.2 | 52.5 | 50.6 | 43.7 | 31.7 |

EXAMPLE 4

Poly(ethylene-acrylic acid 92:8) (10 g) was dissolved in 200 mL boiling toluene and precipitated in 800 mL methanol. The precipitated polymer was filtered and dried at 60° C. i.vac overnight. Then the dried polymer was co-milled with 200 mL dry heptane in a porcelain ball mill under nitrogen atmosphere for 120 hours to give a polymer powder suspension. Sixty (60) mL of this suspension was mixed with 20 mL di-n-butyl magnesium-triethyl aluminum complex in heptane (0.95 mmol Mg/mL, Mg/Al=7.8) at 60° C. for 1 hour with adequate agitation. The reaction mixture was filtered. The solid was washed with dry heptane and suspended in 80 mL heptane. Ten (10) mmol $HSiCl_3$ was added to the suspension and the reaction was conducted at 60° C. for one hour. The solid product was filtered out, washed with dry heptane and suspended in 70 mL heptane. Ten (10) mL titanium tetrachloride was then added into the suspension of this solid magnesium-modified polymer support and heated for one hour at 60° C. with vigorous stirring. The colour of the suspension changed from white to pink-brown upon adding titanium tetra-chloride. The reaction mixture was again filtered and the solid phase was washed with plenty of dry heptane and then dried under nitrogen stream to yield a polymer-supported catalyst constituent containing 1.35% wt Ti; 1.66% wt Mg and 10.0% wt Cl.

A polymerization was carried out in a 500 mL autoclave which was purged with nitrogen and charged with ethylene monomer and 250 mL heptane. Triisobutyl aluminum (0.49 mmol) was added as a cocatalyst. The solid catalyst constituent described above (11.9 mg) was added to start the polymerization. Ethylene was introduced continuously to maintain the total pressure at 2 atm. After 2 hours reaction at 70° C., methanol was added to quench the polymerization. The polymer yield was 19.4 kg polyethylene/g-Ti.h.$P_{C_2H_4}$(atm). The resulting polyethylene was branch-free with a melting point of 141.8° C., a crystallinity(DSC) of 74.5%, a bulk density of 0.30 g/cm³ and a density of 0.952 g/cm³.

EXAMPLE 5

The solid catalyst constituent prepared in Example 4 was utilized for polymerization in the presence of hydrogen. The polymerization procedure was basically the same as in Example 4 except that a predetermined amount of hydrogen was charged into the reactor to control the molecular weight of the polyethylene product. The results are given in the Table 4 below:

TABLE 4

| COMPONENT | Run A | Run B | Run C | Run D |
|---|---|---|---|---|
| monomer(s) | ethylene | ethylene | ethylene | ethylene |
| catalyst | Example 4 | Example 4 | Example 4 | Example 4 |
| milimoles of Ti | 0.0034 | 0.0038 | 0.0039 | 0.0036 |
| milimoles of Al | 0.49 | 0.50 | 0.50 | 0.50 |
| solvent | heptane | heptane | heptane | heptane |
| liters of solvent | 0.25 | 0.25 | 0.25 | 0.25 |
| hydrogen pressure mm Hg | 0 | 81 | 157 | 230 |
| monomer pressure mm Hg | 1198 | 1140 | 1059 | 993 |
| reaction temperature (°C.) | 70 | 70 | 70 | 70 |
| reaction time - minutes | 120 | 120 | 120 | 120 |
| catalyst yield kg PE/g-Ti.h.$P_{C_2C_4}$(atm) | 19.4 | 26.9 | 21.7 | 13.3 |

EXAMPLE 6

The solid catalyst constituent prepared in Example 4 was utilized for the copolymerization of ethylene with 1-hexene. The polymerization procedure was similar to that in Example 4 except that a predetermined amount of 1-hexene was injected into the reactor as a comonomer and that the polymerization was carried out for 15 minutes. The polymer yield was much higher than that of the homopolymerization. The results are given in the Table 5 below:

TABLE 5

| COMPONENT | Run A | Run B | Run C | Run D | Run E |
|---|---|---|---|---|---|
| monomer | ethylene | ethylene | ethylene | ethylene | ethylene |
| comonomer | 1-hexene | 1-hexene | 1-hexene | 1-hexene | 1-hexene |
| catalyst | Example 4 | Example 4 | Example 4 | Example 4 | Example 4 |
| milimoles of Ti | 0.0043 | 0.0041 | 0.0035 | 0.0039 | 0.0036 |

TABLE 5-continued

| COMPONENT | Run A | Run B | Run C | Run D | Run E |
|---|---|---|---|---|---|
| milimoles of Al | 0.53 | 0.56 | 0.51 | 0.50 | 0.49 |
| solvent | heptane | heptane | heptane | heptane | heptane |
| liters of solvent | 0.25 | 0.25 | 0.25 | 0.25 | 0.25 |
| monomer concentration mol/L | 0.116 | 0.114 | 0.113 | 0.112 | 0.112 |
| comonomer concentration mol/L | 0 | 0.032 | 0.064 | 0.16 | 0.32 |
| reaction temperature °C. | 60 | 60 | 60 | 60 | 60 |
| reaction time - minutes | 15 | 15 | 15 | 15 | 15 |
| catalyst yield | | | | | |
| kg copolymer/g-Ti.h | 16.8 | 59.0 | 119.7 | 122.3 | 102.5 |
| Melting point (°C.) | 141.8 | 135.7 | 130.3 | 126.6 | 124.7 |
| crystallinity (%) | 73.9 | 57.1 | 56.4 | 45.5 | 33.7 |
| density (g/cm$^3$) | ca. 0.95 | — | — | 0.92 | 0.90 |

EXAMPLE 7

Various catalyst supports were prepared both according to the present invention and according to other formulations. The supports were then used to prepare supported catalysts and the catalytic activities of the resulting catalysts were determined. The types of support produced in this way are shown in Table 6 below:

TABLE 6

| SUPPORT NO. | TYPE OF POLYMER | FUNCTIONAL GROUPS |
|---|---|---|
| 7 | ethylene-acrylic acid copolymer (92:8, 2.51 mmol/g) | carboxylic acids |
| 9 | ethylene-vinyl alcohol copolymer (vinyl alcohol 14.7%) | hydroxyl groups |
| 4 | styrene-allyl alcohol copolymer (hydroxyl group 5.4–6%) | hydroxyl groups |
| 5 | ethylene-maleic anhydride copolymer (probably alternative) | anhydride group |
| 2 | polyethylene graft PE—G-2-(tert-butylamino)ethyl Methacrylate D.G.= 2.7 wt %, ca. 0.15 mmol/g | ester and amino groups |
| 3 | PE—G-2-(dimethylamino)ethyl Methacrylate D.G.= 3.9 wt %, ca. 0.25 mmol/g | ester and amino groups |
| 6 | Polyethylene (for comparison) | |
| 10 | Merrifield's peptide resin, 2% cross-linked (chloromethylated styrene/divinylbenzene copolymer) 200–400 mesh. Approx 1 meq. Cl/g | chloromethyl group |
| 11 | Pst—CH$_2$OH, transformed from support #10 through hydrolysis. | hydroxyl groups |

Magnesium compounds tested:
1. Magnesium chloride (MgCl$_2$).
2. n-Butyl magnesium chloride (n-BuMgCl)
3. Di-n-butyl magnesium (n-Bu$_2$Mg)
4. Complex of di-n-butyl magnesium with triethylaluminum (n-Bu$_2$Mg.Et$_3$Al)

Aluminum compounds tested:
1. Triethylaluminum (Et$_3$Al)
2. Triisobutylaluminum (i-Bu$_3$Al)

The activities of the catalysts based on the different polymer supports are shown in Table 7 below:

TABLE 7

Activity of catalysts based on different polymer supports

| Support | Catalyst | Mg Compound$^a$ | Al Compound$^b$ | Activity kg PE/g-Ti.h.atm (C$_2$H$_4$) |
|---|---|---|---|---|
| #7 | 7-5 | R$_2$Mg | TIBA | 28.9* |
| | 7-6 | R$_2$Mg/HSiCl$_3$ | TIBA | 19.4 |
| #9 | 9-2 | RMgCl | TEA | 2.7* |
| #4 | 4-1 | — | TEA | 0.4 |
| | 4-3 | RMgCl | TEA | 4.0 |
| | 4-6 | R$_2$Mg | TIBA | 4.4* |
| #5 | 5-1 | — | TEA | trace |
| #2 | 2-1 | — | TEA | trace |
| | 2-2 | MgCl$_2$ | TEA | trace |
| | 2-4 | RMgCl | TEA | 11.3* |
| | 2-6 | R$_2$Mg | TIBA | 3.3 |
| #3 | 3-1 | — | TEA | trace |
| | 3-2 | MgCl$_2$ | TEA | 5.4* |
| | 3-5 | RMgCl | TEA | trace |
| #6 | 6-2 | MgCl$_2$ | TEA | 3.1* |
| #10 | 10-1 | R$_2$Mg | TIBA | trace |
| #11 | 11-1 | R$_2$Mg | TIBA | trace |
| | 11-2 | R$_2$Mg/HSiCl$_3$ | TIBA | trace |

*Optimum activity obtained without the presence of hydrogen. With hydrogen the activity is 30.9.
$^a$Titanium tetrachloride was used in all catalysts as the key component. Magnesium compounds were used as modifier, where RMgCl: n-Butyl magnesium chloride; and R$_2$Mg: Complex of di-n-butyl magnesium with triethylaluminum.
$^b$Aluminum compounds were used as cocatalyst, where TEA: triethylaluminum; TIBA: triisobutylaluminum.

EXAMPLE 8

The activities of catalysts produced according to the present invention were compared with the activities of various catalyst produced according to earlier patents and the results are shown in Table 8 below:

TABLE 8

Comparison of the Activity of Catalysts of the Invention With Some Prior Art Catalysts

| Inventor(s) | U.S. Pat. No. | Polymer Support | Activity[a] Kg PE/gTi.h.P$_{C_2H_4}$ (atm) |
|---|---|---|---|
| Present Invention | Catalyst 7-5 | Poly(ethylene-co-acrylic acid) | 30.9[c] (114[b]) |
| Present Invention | Catalyst 7-6 | Poly(ethylene-co-acrylic acid) | 26.9[c] (122[b]) |
| Shannon (1983) | 4,397,764 | Pst-amino borane (Amborane-335) | 0.42 |
| Benton (1981) | 4,289,651 | Chrysotile organosilicon polymer | 0.19 |
| Bedell (1986) | 4,623,707 | Chloromethylated Pst-DVB copolymer | 4.3 |
| Beach (1982) | 4,329,255 | Polyethylene | 1.13 |
| Hoff (1981) | 4,269,418 | PE—X-methylbicyclo[2,2,1]hept-5-ene-2,3-dicarboxylic acid | 20~30 |

[a]Activity was converted to KgPE/GTi.h.P$_{C_2H_4}$ (atm)
[b]For ethylene-1-hexene copolymerization
[c]For Homopolymerization.

What we claim is:

1. A process of producing a supported catalyst suitable for polymerization and copolymerization of olefins, which comprises the following steps:
   (a) dissolving a co-polymer containing units derived from acrylic acid and units derived from a monomer selected from the group consisting of ethyene, propylene and styrene and containing about 5–30% by weight carboxylic acid groups in a solvent and then precipitating the co-polymer in a polar non-solvent;
   (b) wet grinding the precipitated co-polymer with a liquid inert thereto to form a dispersion;
   (c) mixing the dispersion with a reactant selected from the group consisting of an organomagnesium compound and a complex of an organomagnesium compound and an organoaluminum compound at a temperature and for a time suitable for reaction of the functional groups with the reactant to form a magnesium-modified polymer;
   (d) reacting the resulting magnesium-modified polymer with a transition metal chloride to form a catalyst constituent; and
   (e) reacting the catalyst constituent with an organometallic compound of a metal of Group II or III of the Mendeleev Periodic Table.

2. A process as claimed in claim 1 wherein said organomagnesium compound is dibutyl magnesium, and said organomagnesium complex is a complex of di-n-butyl magnesium and triethyl aluminum.

3. A process according to claim 1 which comprises employing as said polymer a copolymer of ethylene and acrylic acid having a molar ratio of about 92:8, respectively.

4. A process according to claim 1 wherein said magnesium-modified polymer of step (c) is reacted with a halogen-containing silicon compound before being reacted with said transition metal compound in step (d).

5. A process according to claim 4 wherein said halogen-containing silicon compound contains chlorine.

6. A process according to claim 4 wherein the halogen-containing silicon compound is trichlorosilane.

7. A process according to claim 1 wherein said solvent used in step (a) is a non-polar solvent.

8. A process according to claim 1 wherein said polar non-solvent employed in step (a) is methanol.

9. A process according to claim 1 wherein said transition metal chloride is titanium tetrachloride.

10. A process according to claim 1 wherein said organometallic compound is selected from the group consisting of triisobutyl aluminum, triethyl aluminum, trihexylaluminum and trioctylaluminum.

11. A supported catalyst suitable for catalyzing the polymerization and copolymerization of olefins, comprising transition metal chloride catalysts supported on a magnesium-modified polymer acting as a catalyst support, said catalyst support having been produced by the following steps:
   (a) dissolving a co-polymer containing units derived from acrylic acid and units derived from a monomer selected from the group consisting of ethylene, propylene and styrene and containing about 5 to 30% by weight carboxylic acid groups in a solvent and then precipitating the polymer in a polar non-solvent;
   (b) wet-grinding the precipitated polymer with a liquid inert thereto to form a dispersion; and
   (c) mixing the dispersion with a reactant selected from the group consisting of an organomagnesium compound and a complex of an organomagnesium compound and an organoaluminum compound at a temperature and for a time suitable for reaction of the functional groups with the reactant to form a magnesium-modified polymer.

12. A supported catalyst according to claim 11 wherein said copolymer of step (a) is a copolymer of ethylene and acrylic acid having a molar ratio of about 92:8, respectively.

13. A supported catalyst according to claim 11 wherein said magnesium-modified copolymer of step (c) is further reacted with a halogen-containing silicon compound.

14. A supported catalyst according to claim 13 wherein said halogen-containing silicon compound contains chlorine.

15. A supported catalyst according to claim 13 wherein said halogen-containing silicon compound is trichlorosilane.

16. A process for producing a polymer support for a transition metal chloride catalyst, which comprises:
   (a) dissolving a co-polymer containing units derived from acrylic acid and units derived from a monomer selected from the group consisting of ethylene, propylene and styrene and containing about 5 to 30% by weight carboxylic acid groups in a solvent and then precipitating the polymer in a polar non-solvent;
   (b) wet-grinding the precipitated polymer with a liquid inert thereto to form a dispersion; and
   (c) mixing the dispersion with a reactant selected from the group consisting of an organomagnesium compound and a complex of an organomagnesium compound and an organoaluminum compound at a temperature and for a time suitable for reaction of the functional groups with the reactant to form a magnesium-modified polymer.

17. A process according to claim 16 wherein said magnesium-modified polymer of step (c) is reacted with a halogen-containing silicon compound.

18. A magnesium-modified polymer suitable as a catalyst support for supporting a transition metal chloride catalyst, said support having been produced by:
   (a) dissolving a co-polymer containing units derived from acrylic acid and units derived from a monomer selected from the group consisting of ethylene, propylene and styrene and containing about 5 to 30% by weight carboxylic acid-groups in a solvent and then precipitating the polymer in a polar non-solvent;
   (b) wet-grinding the precipitated polymer with a liquid inert thereto to form a dispersion; and
   (c) mixing the dispersion with a reactant selected from the group consisting of an organomagnesium compound and an organoaluminum compound at a temperature and for a time suitable for reaction of the functional groups with the reactant to form a magnesium polymer.

19. A polymer according to claim 18 wherein said magnesium-modified polymer of step (c) is reacted with a halogen-containing silicon compound.

* * * * *